Patented Nov. 26, 1935

2,022,434

UNITED STATES PATENT OFFICE 2,022,434

ENAMEL WARE

Jacob E. Rosenberg, Pittsburgh, Pa., assignor to The O. Hommel Company, a corporation of Pennsylvania No Drawing. Application January 22, 1935, Serial No. 2,964

2 Claims. (Cl. 91—73)

In the production of enamel ware, the desirability is known of initially applying to the surface of the steel a coating of an insoluble salt of cobalt—typically the oxide—in order to effect a stronger bond between the subsequently applied and fired enamel and the body of steel itself. The specific value of cobalt is well recognized in this connection, and, while manifestly a better distribution of a cobalt salt upon the surface of the steel is afforded by employing a soluble salt—that is to say, a water-soluble salt of cobalt—and dipping the article in a solution of the salt, it has heretofore been found undesirable and disadvantageous to employ a water-soluble salt of cobalt; for the enamel itself is applied in the form of a slip—that is to say, in the form of a preparation made fluid by water—and, if the initially applied cobalt be present in the form of a water-soluble salt, that salt will, upon the application of the slip, go into solution in the water content of the slip, and so be distributed and rendered less effective for bonding purposes, and at the same time it will prove itself relatively objectionable in modifying the color of the enamel.

I have discovered that, employing as the cobalt salt the hydroxide, I may dissolve it in an ammoniacal aqueous solution, and enjoy the advantage of effecting distribution by dipping the article in a solution of the salt; and that then, by allowing the solution to evaporate and the ammonia to escape, I may have remaining, properly and advantageously distributed upon the surface, cobalt hydroxide, which (the ammonia having escaped), insoluble in water alone, and accordingly not subject to solution in the water content of the subsequently applied slip, and therefore not objectionable for the reasons stated, is effective for affording bond, uncompromised by any tendency to go into solution in the water of the slip.

I have further perceived that the application of a solution of cobalt hydroxide in water carrying a dissolved content of ammonium hydroxide has advantage in the economy of production in this way: namely, that since the steel material that is to be enameled is prepared for the reception of the enameled surface by pickling, and since an essential ultimate step of pickling is neutralization, the dipping of the article in the ammoniacal solution (essentially alkaline in nature) preparatory to the reception of the slip may be relied upon wholly or substantially for the ultimate neutralization of acid remaining in consequence of the pickling operation. Thus a saving may be enjoyed in the number of steps in the operation, or in the quantities of material involved, or both.

The procedure involves the dipping of the article (and here it may be assumed that the article has not been otherwise completely neutralized after pickling) in the solution described—that is to say, in the ammoniacal solution of cobalt hydroxide. After dipping, drying follows, with the escape of ammonia and water vapor, and the retention upon the surface of the steel in minute distribution of a fine coating of insoluble cobalt hydroxide. The so coated and dried article is then dipped in the slip of enamel material—the regular operation being in this respect followed—and then the slip-coated article is fired. In the firing, the cobalt salt that lies immediately upon the surface of the steel affords its known advantage of increasing the strength of the union of the glass to the steel, and the cobalt salt described—being an insoluble salt—is not subject to the disadvantage that attends the use of soluble cobalt salts—the disadvantage, namely, of going into solution in the water present in the slip.

I have, then, the advantages, first, of such a distribution of the cobalt salt as is only to be obtained by means of solution; second, the advantage of insolubility in the water present in the slip at the time when the slip is applied; and, third, the advantage of the ammoniacal solution of the cobalt salt, in that its alkalinity may be made effective in the neutralizing of the pickled steel article, otherwise ready for the enameling operation.

It is desirable that the solvent for the cobalt salt (typically the hydroxide) shall be an aqueous solution, not of ammonium hydroxide alone, but of ammonium hydroxide and another ammonium salt, such as the nitrate or carbonate, and preferably the carbonate. The advantage is that the strength of the ammonium hydroxide may be reduced, and a solution employed that is much easier to handle, in that the quantity of ammonium vapor given off is reduced.

The successful operation of the invention does not require that the operator limit himself to cobalt hydroxide in the preparation of his solution. He may employ another cobalt compound, for example, the sulphate. Cobalt sulphate will go into solution in an ammonium solution in which the concentration of ammonia is relatively high, and when thereafter, ammonia escaping, there is reprecipitation, the reprecipitation will be of cobalt hydroxide, which is the salt desired.

Within the terms ammonium salt and ammoniacal solution I mean to include substances that contain, not the ammonium radical in simple form merely, but substances that contain derivatives thereof—specifically, the amines—; for the amine salts and solutions of the amine salts serve my purposes precisely in the manner described with respect to the ammonium salts and solutions.

I claim as my invention:

1. The method herein described of enameling a steel article which consists in applying to the surface to be enameled an ammoniacal solution of a cobalt compound, evaporating the applied solution with the escape of ammonia and the consequent precipitation of cobalt hydroxide insoluble in water in the absence of ammonia, covering the so coated surface with a slip of prepared enamel rendered fluid by water, drying, and firing the so prepared material.

2. The method herein described of enameling a steel article which includes pickling the article, dipping the pickled article in an ammoniacal solution of a cobalt compound, and drying the dipped article, whereby both neutralization of the acid residue of pickling is effected and the article remains bearing a finely distributed coating of cobalt hydroxide that in the absence of ammonia is insoluble in water, dipping the so coated article in a slip of an enamel preparation rendered fluid with water, drying, and firing the so prepared article.

JACOB E. ROSENBERG.